(12) United States Patent
Kwak et al.

(10) Patent No.: US 10,526,739 B2
(45) Date of Patent: Jan. 7, 2020

(54) WASHING MACHINE AND METHOD FOR CONTROLLING THE SAME

(71) Applicant: LG Electronics Inc., Seoul (KR)

(72) Inventors: Daewook Kwak, Seoul (KR);
Youngsoo Kim, Seoul (KR);
Maengcheol Kim, Seoul (KR);
Gihyeong Do, Seoul (KR); Moonsoo Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/623,060

(22) Filed: Jun. 14, 2017

(65) Prior Publication Data

US 2017/0356116 A1 Dec. 14, 2017

(30) Foreign Application Priority Data

Jun. 14, 2016 (KR) .......................... 10-2016-0073549

(51) Int. Cl.
*D06F 33/02* (2006.01)
*D06F 23/02* (2006.01)
(Continued)

(52) U.S. Cl.
CPC .............. *D06F 33/02* (2013.01); *D06F 23/02* (2013.01); *D06F 23/06* (2013.01); *D06F 37/304* (2013.01); *D06F 37/38* (2013.01); *D06F 37/42* (2013.01); *D06F 39/004* (2013.01); *D06F 39/005* (2013.01); *D06F 39/045* (2013.01);
(Continued)

(58) Field of Classification Search
CPC .. D06F 33/02; D06F 35/006; D06F 2202/085; D06F 2204/086; D06F 39/003; D06F 39/087; D06F 2204/04; D06F 39/081; D06F 2204/084; D06F 2216/00
USPC ........ 8/158, 137, 159, 147; 68/12.05, 12.02, 68/12.04, 12.21, 12.19, 207, 12.12, 12.01, 68/24, 12.03, 12.27; 134/18, 22.1, 113, 134/95.1
See application file for complete search history.

(56) References Cited

U.S. PATENT DOCUMENTS 4,195,500 A * 4/1980 Tobita ..................... D06F 33/02
134/113
4,662,193 A * 5/1987 Honda .................... D06F 33/02
68/12.05
(Continued)

FOREIGN PATENT DOCUMENTS

CN 103025945 4/2013
CN 103866527 6/2014
(Continued)

OTHER PUBLICATIONS

European Search Report in European Application No. EP 17175711, dated Aug. 30, 2017, 6 pages.

*Primary Examiner* — David G Cormier
*Assistant Examiner* — Thomas Bucci
(74) *Attorney, Agent, or Firm* — Fish & Richardson P.C.

(57) ABSTRACT

Provided are a washing machine and a method for controlling the same. The method for controlling a washing machine includes supplying water to a tub, driving a driving unit to perform tumbling to rotate a drum disposed in the tub, calculating a water level variation in the tub, and displaying freeze state information on a display unit when the calculated water level variation is less than a reference water level variation.

13 Claims, 5 Drawing Sheets

(51) Int. Cl.
  *D06F 23/06*  (2006.01)
  *D06F 37/30*  (2006.01)
  *D06F 37/38*  (2006.01)
  *D06F 39/00*  (2006.01)
  *D06F 39/04*  (2006.01)
  *D06F 39/08*  (2006.01)
  *D06F 37/42*  (2006.01)

(52) U.S. Cl.
  CPC .......... *D06F 39/085* (2013.01); *D06F 39/087* (2013.01); *D06F 39/088* (2013.01); *D06F 2202/04* (2013.01); *D06F 2202/085* (2013.01); *D06F 2204/04* (2013.01); *D06F 2204/065* (2013.01); *D06F 2204/084* (2013.01); *D06F 2204/088* (2013.01); *D06F 2204/10* (2013.01)

(56) References Cited

U.S. PATENT DOCUMENTS

| | | | | | |
|---|---|---|---|---|---|
| 5,161,393 | A  * | 11/1992 | Payne | ............... | D06F 39/003 68/12.04 |
| 5,720,064 | A  * | 2/1998 | Koo | ............... | D06F 39/087 8/158 |
| 5,870,905 | A  * | 2/1999 | Imamura | ............... | D06F 35/005 68/12.04 |
| 6,255,952 | B1 * | 7/2001 | Jang | ............... | D06F 33/02 340/517 |
| 7,421,752 | B2 * | 9/2008 | Donadon | ............... | D06F 39/003 8/158 |
| 8,387,272 | B2 * | 3/2013 | Kim | ............... | D06F 58/28 165/166 |
| 9,243,987 | B2 * | 1/2016 | Chanda | ............... | G01N 9/00 |
| 2004/0007029 | A1 * | 1/2004 | Bolduan | ............... | D06F 39/004 68/12.02 |
| 2004/0148971 | A1 * | 8/2004 | No | ............... | D06F 39/087 68/12.02 |
| 2005/0022319 | A1 * | 2/2005 | Kim | ............... | D06F 39/003 8/159 |
| 2005/0022564 | A1 * | 2/2005 | Kim | ............... | D06F 39/003 68/12.04 |
| 2005/0028299 | A1 * | 2/2005 | Jeon | ............... | D06F 39/003 8/159 |
| 2005/0097924 | A1 * | 5/2005 | Kim | ............... | D06F 39/087 68/12.05 |
| 2005/0144734 | A1 * | 7/2005 | Yang | ............... | D06F 35/006 8/149.3 |
| 2005/0144735 | A1 * | 7/2005 | Yang | ............... | D06F 35/006 8/149.3 |
| 2005/0166334 | A1 * | 8/2005 | Clouser | ............... | D06F 33/02 8/159 |
| 2005/0257576 | A1 * | 11/2005 | Omura | ............... | D06F 35/006 68/12.05 |
| 2006/0005318 | A1 * | 1/2006 | Yoon | ............... | D06F 39/088 8/158 |
| 2006/0107468 | A1 * | 5/2006 | Urbanet | ............... | D06F 39/003 8/158 |
| 2006/0168740 | A1 * | 8/2006 | Ha | ............... | D06F 33/02 8/158 |
| 2007/0119217 | A1 * | 5/2007 | Worthington | ............... | D06F 25/00 68/158 |
| 2007/0169281 | A1 * | 7/2007 | Ha | ............... | D06F 39/003 8/158 |
| 2008/0028801 | A1 * | 2/2008 | Czyzewski | ............... | D06F 35/006 68/12.05 |
| 2008/0099051 | A1 * | 5/2008 | Kim | ............... | D06F 35/002 134/18 |
| 2008/0163930 | A1 * | 7/2008 | Ha | ............... | A47L 15/0031 137/1 |
| 2008/0189875 | A1 * | 8/2008 | Czyzewski | ............... | D06F 35/006 8/159 |
| 2008/0201867 | A1 * | 8/2008 | Bang | ............... | D06F 33/02 8/158 |
| 2008/0244836 | A1 * | 10/2008 | Kim | ............... | D06F 33/02 8/159 |
| 2008/0250819 | A1 * | 10/2008 | Park | ............... | D06F 35/00 68/12.05 |
| 2008/0276381 | A1 * | 11/2008 | Son | ............... | D06F 58/203 8/149.3 |
| 2008/0282479 | A1 * | 11/2008 | Darby | ............... | D06F 39/003 8/159 |
| 2009/0007346 | A1 * | 1/2009 | Ha | ............... | D06F 33/02 8/159 |
| 2009/0077755 | A1 * | 3/2009 | Park | ............... | D06F 35/00 8/137 |
| 2010/0024490 | A1 * | 2/2010 | Nieh | ............... | D06F 33/02 68/12.02 |
| 2010/0064445 | A1 * | 3/2010 | Nieh | ............... | D06F 35/006 8/159 |
| 2011/0126360 | A1 * | 6/2011 | Cho | ............... | D06F 35/006 8/137 |
| 2012/0005840 | A1 * | 1/2012 | Jang | ............... | D06F 33/02 8/137 |
| 2013/0239336 | A1 * | 9/2013 | Kim | ............... | D06F 33/02 8/137 |
| 2013/0239338 | A1 * | 9/2013 | Sunder | ............... | C11D 3/222 8/137 |
| 2014/0096327 | A1 * | 4/2014 | Lee | ............... | D06F 39/087 8/137 |
| 2014/0158210 | A1 * | 6/2014 | Kim | ............... | D06F 39/08 137/2 |
| 2014/0236363 | A1 * | 8/2014 | Ha | ............... | D06F 33/02 700/282 |
| 2014/0259448 | A1 * | 9/2014 | Alexander | ............... | D06F 33/02 8/137 |
| 2015/0113740 | A1 * | 4/2015 | Lee | ............... | D06F 39/003 8/137 |
| 2015/0240405 | A1 * | 8/2015 | Kwon | ............... | D06F 39/085 8/137 |
| 2015/0337477 | A1 * | 11/2015 | Mazzon | ............... | D06F 35/005 8/137 |
| 2015/0354122 | A1 * | 12/2015 | Kwon | ............... | D06F 39/003 8/137 |

FOREIGN PATENT DOCUMENTS

| | | |
|---|---|---|
| EP | 2746452 | 6/2014 |
| JP | H04129597 | 4/1992 |
| KR | 100552502 | 2/2006 |
| KR | 10-2012-0012217 | 2/2012 |
| KR | 10-1275554 | 6/2013 |
| KR | 1020150060068 | 6/2015 |

* cited by examiner

WASHING MACHINE AND METHOD FOR CONTROLLING THE SAME

CROSS-REFERENCE TO RELATED APPLICATIONS

The present application claims the benefits of priority to Korean Patent Application No. 10-2016-0073549, filed on Jun. 14, 2016, which is herein incorporated by reference in its entirety.

BACKGROUND

The present disclosure relates to a washing machine and a method for controlling the same.

In general, a washing machine includes a tub which stores wash water and a drum which is rotatably provided in the tub to store clothing or the like (hereinafter, referred to as "laundry"), and washes and spin-dries the laundry according to the rotation of the drum.

A washing machine may be classified into a top loading type washing machine in which a drum rotates around a vertical axis extending in a vertical direction such that laundry is loaded from the top of the washing machine, and a front loading type washing machine in which a drum rotates around a horizontal axis extending in a horizontal direction such that laundry is loaded from the front of the washing machine.

The top loading type washing machine may be largely classified into an agitator type washing machine and a pulsator type washing machine. The agitator type washing machine washes laundry by rotating a washing rod that is vertically erected at a center of a drum, and the pulsator type washing machine washes laundry by rotating a drum or a disk-shaped pulsator or drum disposed under the drum.

The front loading type washing machine is generally called a drum washing machine and includes a lifter on an inner peripheral surface of a drum. The front loading type washing machine performs washing in such a manner that the lifter lifts and drops laundry as the drum rotates.

A washing machine includes a water supply device that supplies water to a tub, and a water drainage device that drains wash water after washing, rinsing, and spin-drying.

In the case of an existing washing machine, since wash water is frozen in an environment such as winter season in which outdoor temperature falls below 0 degrees, a water supply device or a water drainage device may not operate normally.

In particular, when residual water exists in drainage ports of the water drainage device and the tub, the residual water may be frozen. If the residual water is frozen, water may not be drained out from the drum washing machine.

If the freeze makes water drainage impossible, a user has to directly pour hot water into the drum washing machine so as to unfreeze water. Thus, there is a risk that the user will be scalded, and the user feels inconvenient.

Related prior art information is as follows.

Patent Application Publication Number (Publication Date): 10-2012-0012217 (Feb. 29, 2012)

Title of the Invention: WASHING MACHINE AND METHOD FOR CONTROLLING THE SAME

The prior art document discloses a freeze protection operation of operating a heater by comparing a set temperature with a temperature sensed by a temperature sensor.

However, in a case where a main body of a washing machine is installed inclined at a predetermined angle with respect to the ground, or a tub is disposed inclined at a predetermined angle with respect to the ground, if residual water exists in the tub and a temperature sensor is disposed adjacent to a heater, the temperature sensor completely sinks under water, but a part of the heater may not sink under water.

In this case, if the heater is operated by determining freeze or non-freeze based on only the temperature sensed by the temperature sensor as disclosed in the prior art document, a part of the heater that does not sink under water may be overheated to cause a fire.

Therefore, if the freeze or non-freeze is sensed through the temperature sensor, there is a risk that misjudges the freeze or non-freeze. This misjudgment may cause erroneous operations.

SUMMARY

Embodiments provide a washing machine and a method for controlling the same, capable of accurately sensing freeze or non-freeze, regardless of a position of a sensor, a structure of a washing machine, and an installation state of a washing machine.

In one embodiment, a washing machine includes: a tub configured to store water; a drum disposed an inner space of the tub and configured to store laundry; a driving unit configured to rotate the drum; a water level sensor configured to sense a water level in the tub; and a control unit configured to control the driving unit and calculate a water level variation through the water level sensed by the water level sensor, wherein the control unit determines freeze or non-freeze based on the water level variation in the process of driving the driving unit to rotate the drum for a predetermined time.

In another embodiment, a method for controlling a washing machine includes: supplying water to a tub; driving a driving unit to perform tumbling to rotate a drum disposed in the tub; calculating a water level variation in the tub; and displaying freeze state information on a display unit when the calculated water level variation is less than a reference water level variation.

In further another embodiment, a method for controlling a washing machine includes: sensing an internal temperature of a tub; determining whether the sensed internal temperature of the tub is equal to or greater than a first reference temperature; and determining freeze or non-freeze by a first freeze/non-freeze determining method when the sensed internal temperature of the tub is equal to or greater than the first reference temperature, and determining freeze or non-freeze by a second freeze/non-freeze determining method when the sensed internal temperature of the tub is less than the first reference temperature.

The details of one or more embodiments are set forth in the accompanying drawings and the description below. Other features will be apparent from the description and drawings, and from the claims.

DETAILED DESCRIPTION OF THE EMBODIMENTS

Hereinafter, specific embodiments of the present disclosure will be described with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

Figure 1:
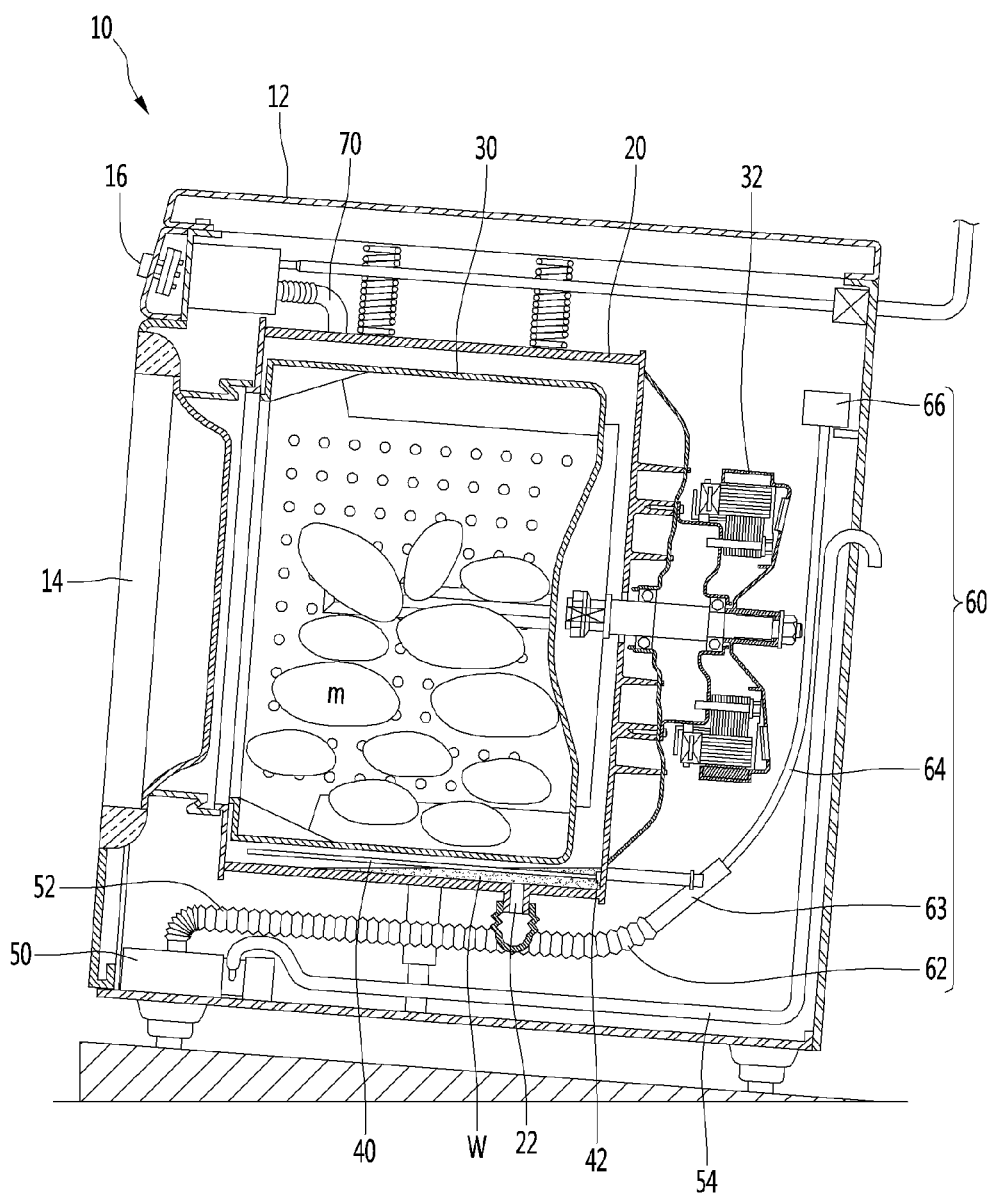
FIG. 1 is a cross-sectional view of a washing machine according to a first embodiment.
Figure 2:
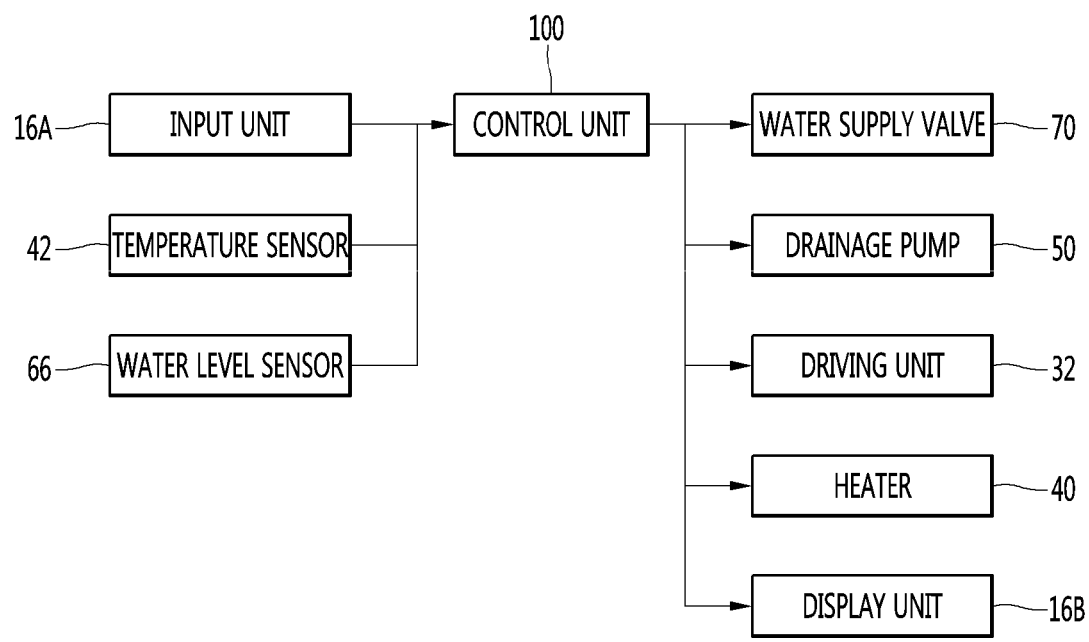
FIG. 2 is a block diagram illustrating the structure of the washing machine according to the first embodiment.

FIG. 1 is a cross-sectional view of a washing machine according to a first embodiment, and FIG. 2 is a block diagram illustrating the structure of the washing machine according to the first embodiment.

Referring to FIGS. 1 and 2, the washing machine 10 according to the first embodiment includes a case 12 forming an outer appearance of the washing machine 10, a tub 20 installed in the inner space of the case 12, a drum 30 installed in the inner space of the tub 20, and a driving unit 32 rotating the drum 30.

A door 14 for loading and unloading laundry may be provided on a front side of the case 12. The door 14 may be mounted to be rotatable forward. A front loading type washing machine in which laundry is loaded and unloaded through the front of the case 12 is illustrated in the present embodiment, but the present disclosure is not limited thereto.

Also, a control panel 16 may be provided on the front side of the case 12. The control panel 16 may include an input unit 16A receiving a user selection and a display unit 16B displaying an operation state of the washing machine 10. The display unit 16B may display information about freeze or non-freeze of the washing machine 10. The control panel 16 may be provided above the door 14.

The tub 20 is a water tank that stores wash water and rinse water. The tub 20 may be configured in a cylindrical shape laid toward one side. In this case, the tub 20 may be disposed such that the bottom surface thereof is parallel to the ground or is inclined at a predetermined angle with respect to the ground. The tub 20 may be disposed such that an opening thereof is laid toward the door 14.

The drum 30 is a washing tank that is rotated by the driving unit 32 so as to wash, rinse, and spin-dry the laundry. The drum 30 may be accommodated in the tub 20, and the outer surface of the drum 30 may be disposed spaced apart from the inner surface of the tub 20 by a predetermined distance.

The drum 30 may be formed in a cylindrical shape such that a rotation center is parallel to the ground or is laid to be inclined at a predetermined angle with respect to the ground, so as to correspond to the tub 20. The front side of the drum 30 may be opened such that the laundry is loaded and unloaded. A plurality of water holes for inflow and outflow of water may be formed in the peripheral surface and the rear surface of the drum 30. Water W inside the tub 20 may pass through the plurality of water holes and move to the inside/outside of the drum 30.

The driving unit 32 may include a stator mounted on the rear surface of the tub 20, a rotor rotating in interaction with the stator, and a rotational shaft installed in the rotor. The rotational shaft penetrates the rear side of the tub 20. A front end of the rotational shaft is coupled to the rear surface of the drum 30, and a rear end is coupled to the rotational shaft.

A water supply valve 70 for supplying water to the tub 20 may be coupled to an upper side of the tub 20. The water may be raw water or wash water in which a detergent is dissolved. The water supply valve 70 may be provided in plurality according to a type of supplied water. For example, the water supply valve 70 may include a hot water valve and a cold water valve.

Meanwhile, a heater 40 for heating water supplied to the tub 20 and a temperature sensor 42 for sensing an internal temperature of the tub 20 may be provided in an inner lower portion of the tub 20.

The heater 40 may be disposed in a space between the inner surface of the tub 20 and the outer surface of the drum 30. For example, the heater 40 may be fixed to the rear surface of the tub 20 and installed to extend forward. The heater 40 may be disposed under the drum 30.

The temperature sensor 42 may be provided on one side of the heater 40. The temperature sensor 42 may be installed on the rear surface of the tub 20 like the heater 40. For example, the temperature sensor 42 may include a thermistor.

Meanwhile, a water drainage port 22 for draining water stored in the tub 20 may be formed in the lower side of the tub 20. For example, the water drainage port 22 may be formed to penetrate the lower surface of the tub 20.

A drainage pump 50 may be provided in a lower portion of the inner space of the case 12. For example, the drainage pump 50 may be disposed below the tub 20. The water drained from the tub 20 through the water drainage port 22 is introduced into the drainage pump 50 through the drainage pipe 52 and is discharged from the case 12 through a drainage tube 54 by the pumping of the drainage pump 50.

The washing machine 10 may further include a water level detection device 60 for detecting a level of water supplied to the tub 20.

The water level detection device 60 may include a water level sensing pipe 62 coupled to one side of the drainage pipe 52, an air chamber 63 coupled to the water level sensing pipe 62 and filled with air providing a pressure according to a level of water rising in the water level sensing pipe 62, a water level sensing tube 64 coupled to the air chamber 63, and a water level sensor 66 coupled to the water level sensing tube 64 to sense a water level by sensing an air pressure in the water level sensing tube 64.

When water is introduced into the tub 20, water is also introduced into the air chamber 63. In this case, the water introduced into the air chamber 63 rises in the air chamber 63 at the same water level as that of the water of the tub 20.

Air inside the air chamber 63 is compressed as much as a volume of the water introduced into the air chamber 63, the compressed air is transferred to the water level sensor 66 through the water level sensing tube 64, and the water level sensor 66 senses the water level in the tub 20 according to the pressure of the transferred air.

The water level sensor 66 senses the water level in the tub 20 and transfers the sensed water level to the control unit 100. The water level sensor 66 may output a frequency corresponding to the pressure of the air transferred through the water level sensing tube 64. In this case, the frequency output from the water level sensor 66 may correspond to the water level in the tub 20, which is measured by the water level sensor 66. Therefore, the frequency output from the water level sensor 66 to the control unit 100 may be a frequency corresponding to the water level in the tub 20.

Also, the washing machine 10 may further include the control unit 100 for controlling the driving of the washing machine 10 and sensing the operating state of the washing machine 10.

The control unit 100 drives at least one of the water supply valve 70, the drainage pump 50, the driving unit 32, and the heater 40 according to the user selection input through the input unit 16A, and displays the operating state of the washing machine 10 on the display unit 16B.

Also, the control unit 100 may sense the operation state of the washing machine 10 by using at least one of the temperature sensor 42 and the water level sensor 66, and may drive at least one of the water supply valve 70, the drainage pump 50, the driving unit 32, and the heater 40 according to the sensed value. For example, the control unit 100 may sense the water level in the tub 20 to open the water supply valve 70 or drive the drainage pump 50.

Also, the control unit 100 may calculate a variation in the frequency received from the water level sensor 66 and determine a water level variation in the tub 20.

Figure 3:
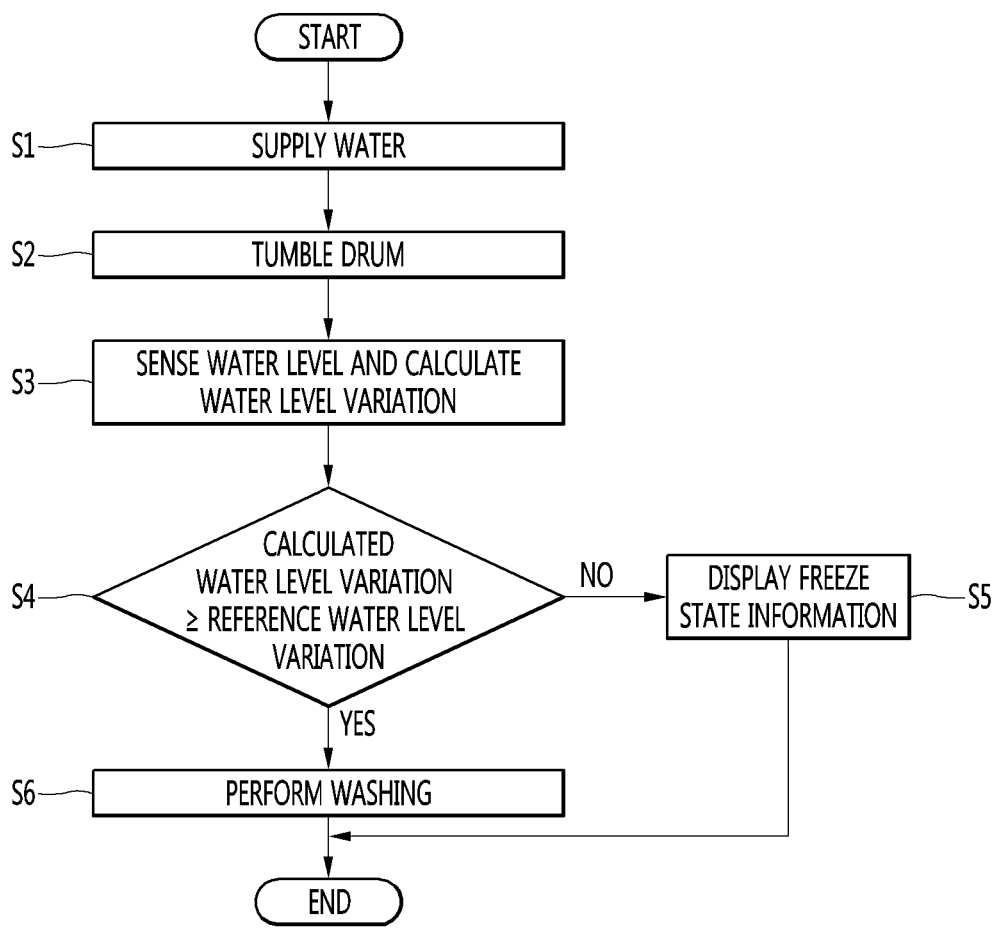
FIG. 3 is a flowchart of a freeze/non-freeze determining method of a washing machine according to a first embodiment.

FIG. 3 is a flowchart of a freeze/non-freeze determining method of a washing machine according to a first embodiment.

Referring to FIG. 3, when power is turned on, the washing machine according to an embodiment supplies a predetermined amount of water to the tub 20 (S1).

In this case, before water is supplied to the tub 20, the washing machine may sense an amount of laundry stored in the drum 30. Then, an amount of water corresponding to the sensed amount of laundry may be supplied to the tub 20.

The control unit 100 opens the water supply valve 70 to supply water to the tub 20, and closes the water supply valve 70 after a predetermined time.

Also, the control unit 100 may display the amount of the supplied water on the display unit 16B. That is, after the water level is sensed through the water level sensor 66, the control unit 100 may display the sensed water level on the display unit 16B.

However, when the water level in the tub 20, which is sensed through the water level sensor 66 after the water supply is completed, is lower than a reference water level or less than a variation for determining that a water level variation during the water supply operation is a normal water supply.

When the water supply is completed in operation S1, the control unit 100 drives the driving unit 32 to rotate the drum 30 (S2).

The drum 30 may be rotated in one direction or the other direction according to a driving direction of the driving unit 32. As one example, the drum 30 may be rotated in one direction and then rotated in the other direction. As another example, the drum 30 may be rotated in one direction for a first reference time, be stopped for a second reference time, and be rotated in the other direction for the first reference time. In this case, the first reference time may be equal to or different from the second reference time.

As another example, the drum 30 may be rotated in one direction for a first reference time, be stopped for a second reference time, and be rotated in the other direction for a third reference time that is different from the first reference time.

In the present embodiment, it has been described that the drum 30 is rotated in the two directions, but the present disclosure is not limited thereto. The drum 30 may be rotated in only one direction. That is, the drum 30 may be rotated in one direction for a first reference time, be stopped for a second reference time, and be rotated again in one direction for the first reference time.

Rotating the drum 30 in a constant pattern as described above may be referred to as tumbling.

In the tumbling operation of the drum 30, the control unit 100 may determine the water level based on information about air pressure sensed by the water level sensor 66, and calculate a water level variation (S3).

In the tumbling operation of the drum 30, since the drum 30 is rotated as long as the water drainage port is not frozen, the amount of water in the air chamber 63 is changed. Accordingly, the air pressure in the water level sensing tube 64 may be changed, and thus, the control unit 100 may calculate the water level variation.

The water level variation may be calculated as the variation in the frequency output from the water level sensor 66 for a predetermined time when the drum 30 is tumbled.

However, in the tumbling operation of the drum 30, the water must not be discharged through the water drainage port 22. For example, in the tumbling operation of the drum 30, the drainage pump 50 must be in a non-operating state. The water level variation is not the measurement of the water level variation according to water drainage, but is for measuring the water level variation according to the tumbling of the drum 30. Therefore, the water in the tub 20 must be constantly maintained.

The control unit 100 compares the water level variation calculated in operation S3 with a reference water level variation (S4).

When the water level variation is equal to or greater than the reference water level variation, it may be determined that the water drainage port 22 is not frozen. On the other hand, when the water level variation is less than the reference water level variation, it may be determined that ice exists in the water drainage port 22. That is, it may be determined that the water drainage port 22 has been frozen.

In this case, the reference water level variation may be understood as a frequency variation of the water level sensor 66. The reference water level variation may be differently set according to the size of the tub, the amount of water in the tub, the diameter of the air tub, or the like.

When it is determined in operation S4 that the water level variation is equal to or greater than the reference water level variation, it is determined that the water drainage port 22 is not frozen, and the washing is started (S6). In the present disclosure, the starting of the washing may mean that a washing cycle is actually performed for washing the laundry. Although limited in the washing cycle, the heater 40 may be operated and thus the wash water in the tub 20 may be heated.

When it is determined that ice does not exist in the water drainage port 22, the wash water may be normally drained through the water drainage port 22 during the operation of the drainage pump 50, and thus, the washing machine 10 may be normally operated.

On the other hand, when it is determined in operation S4 that the water level variation is less than the reference water level variation, the control unit 100 controls the display unit 16B to display freeze state information (S5).

Even when ice exists in the water drainage port 22, if a passage capable of coupling the inside of the tub 20 and the water level sensing pipe 62 is present in the water drainage port 22, water may be supplied to the water level sensing pipe 62 during the water supply operation. Thus, the water level may be determined as a normal water level.

However, in the tumbling operation of the drum 30, as the passage is narrower, an amount of water flowing between the tub 20 and the water level sensing pipe 62 is small, and thus, the water level variation may be less than the reference water level variation.

Therefore, in the present disclosure, the case where the freeze state information is displayed includes not only a case where the water drainage port 22 is completely frozen but also a case where ice exists in the water drainage port 22 to the extent that the water level variation during the tumbling operation of the drum 30 is less than the reference water level variation.

When the water level variation during the tumbling operation of the drum 30 is less than the reference water level variation, the wash water in the drum 30 cannot be normally drained through the water drainage port 22 even when the drainage pump 50 is operated. Therefore, the freeze state information is displayed on the display unit 16B.

In the present embodiment, the freeze or non-freeze is determined by only the water level variation in the tub 20, without using the temperature sensor. Thus, the freeze or non-freeze may be accurately determined, regardless of the installation position of the washing machine and the position of the sensor.

Also, since the freeze or non-freeze can be determined in advance before the washing cycle is performed, it is possible to prevent the washing machine from being stopped during the draining operation after the washing cycle.

Hereinafter, a second embodiment of the present disclosure will be described.

Figure 4:
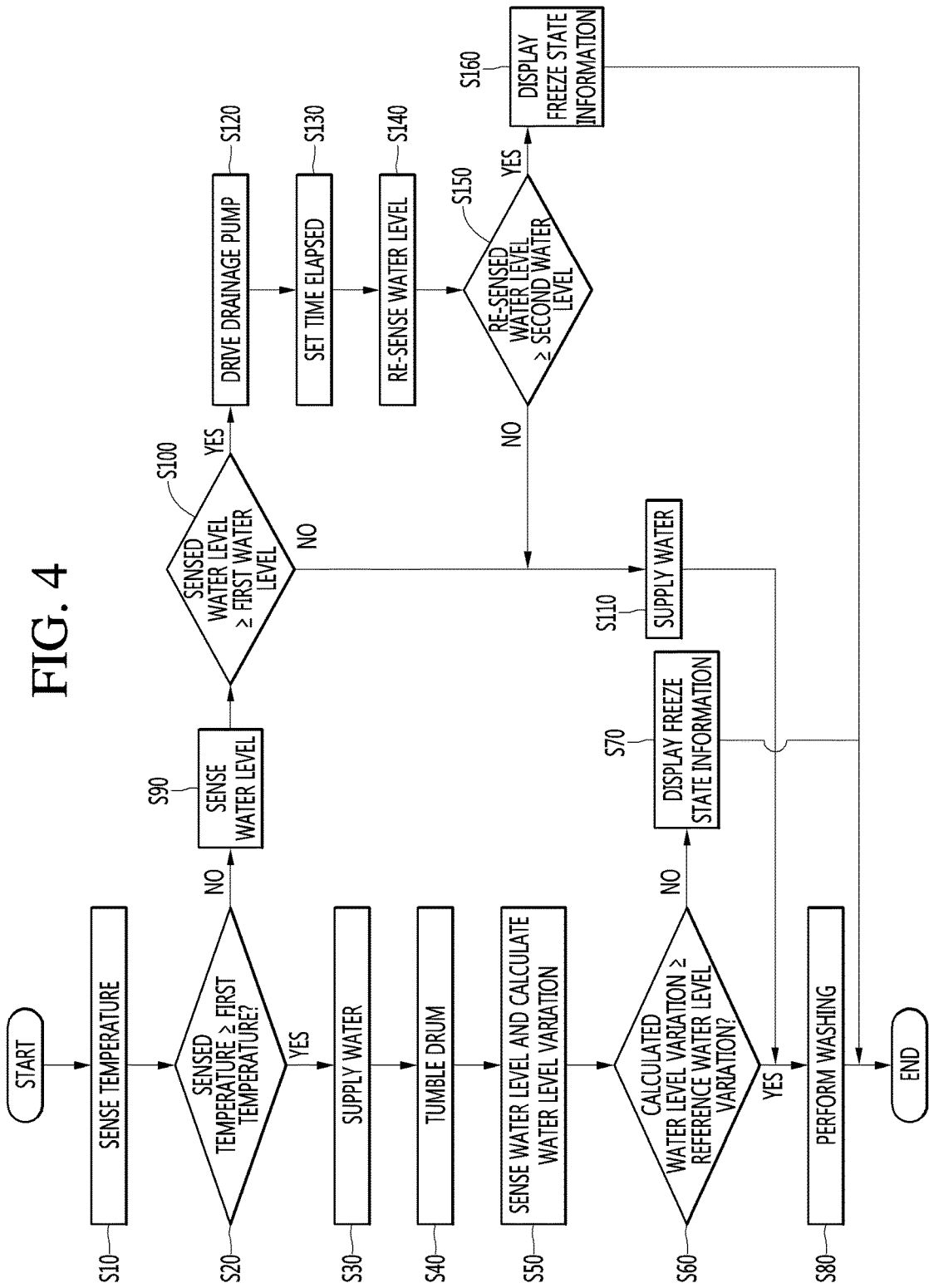
FIG. 4 is a flowchart of a freeze/non-freeze determining method of a washing machine according to a second embodiment.

FIG. 4 is a flowchart of a freeze/non-freeze determining method of a washing machine according to a second embodiment.

Referring to FIG. 4, when the driving of the washing machine is started, the internal temperature of the tub 20 is sensed by using the temperature sensor 42 (S10).

When the temperature sensed in operation S10 is equal to or greater than a first temperature, the same control method as in the first embodiment may be performed. That is, water is supplied to the tub 20 (S30), the drum 30 is tumbled (S40), the water level in the tub 20 is sensed (S50), and the freeze state information is displayed on the display unit 16B (S70) or washing is started (S80) according to the sensed water level variation (S60). In this case, since the drainage pump 50 is in a stopped state, the water level variation sensed by the water level sensor 66 may be changed according to the freeze or non-freeze of the water drainage port 22.

In the present embodiment, the freeze/non-freeze determining method used when the sensed temperature is equal to or greater than the first temperature may be referred to as a first freeze/non-freeze determining method.

On the other hand, when the temperature sensed in operation S10 is less than the first temperature, the water level is sensed (S90).

In the present disclosure, although the first temperature is not limited, the first temperature may be three degrees above zero.

The control unit 100 determines whether the water level sensed in operation S90 is equal to or greater than a first water level (S100). In this case, the first water level may be a water level lower than the lowermost portion of the water drainage port 22. That is, the case where the sensed water level is equal to or greater than the first water level is a case where water exists in the tub 20 and the water drainage port 22, and the case where the sensed water level is less than the first water level is a case where water does not exist in the tub 20 and the water drainage port 22.

When the water level sensed in operation S100 is less than the first water level, water may be supplied to the tub 20 (S110) and the washing may be performed (S80).

Since the case where the sensed water level is less than the first water level is a case where residual water does not exist in the tub 20 and the water drainage port 22, the water drainage port 22 is determined as not being frozen, and thus, the washing may be normally performed.

On the other hand, when the water level sensed in operation S100 is equal to or greater than the first water level, the control unit 100 drives the drainage pump 50 for a set time (S120, S130).

The reason why the drainage pump 50 is driven when the sensed water level is equal to or greater than the first water level is that it is likely that residual water existing in the tub 20 and the water drainage port 22 will be frozen when the temperature is lower than the first reference temperature, that is, 3 degrees above zero. Therefore, the drainage pump 50 may be driven for determining the freeze or non-freeze.

After the set time has elapsed in operation S130, the control unit 100 re-senses the water level and determines whether the re-sensed water level is equal to or greater than a second water level (S140, S150).

When the water level re-sensed in operation S150 is equal to or greater than the second water level, the control unit 100 displays freeze state information on the display unit 160B. Since it is in a state in which the water cannot be drained by the driving of the drainage pump 50, this is done for preventing the washing from being started.

On the other hand, when the water level re-sensed in operation S150 is less than the second water level, water is supplied to the tub 20 (S110) and the washing is started (S80).

In this case, since the water is normally drained by the driving of the drainage pump 50, it is determined as the non-freeze state, and thus, the washing may be started.

In this case, the second water level may be equal to or lower than the first water level. However, the present disclosure is not limited thereto, and the second water level may be higher than the first water level.

In the present embodiment, the freeze/non-freeze determining method used when the sensed temperature is less than the first temperature may be referred to as a second freeze/non-freeze determining method.

In the present embodiment, the freeze/non-freeze determining method may be different according to the internal temperature of the tub 20. That is, when the internal temperature of the tub 20 is less than the first temperature, "water level" is sensed and the freeze or non-freeze is determined, and when the internal temperature of the tub 20 is equal to or greater than the first temperature, "water level variation" according to the tumbling of the drum 30 is sensed and the freeze or non-freeze is determined.

Even when the internal temperature of the tub 20 is equal to or greater than three degrees above zero, ice may exist in the water drainage port 22 in some cases. Therefore, the freeze or non-freeze may be determined through the water level variation caused by the tumbling of the drum 30.

On the other hand, when the internal temperature of the tub 20 is less than three degrees above zero, it is highly likely that ice will exist in the tub 20, and thus, the freeze or non-freeze may be determined by using the water level.

Hereinafter, a third embodiment of the present disclosure will be described.

Figure 5:
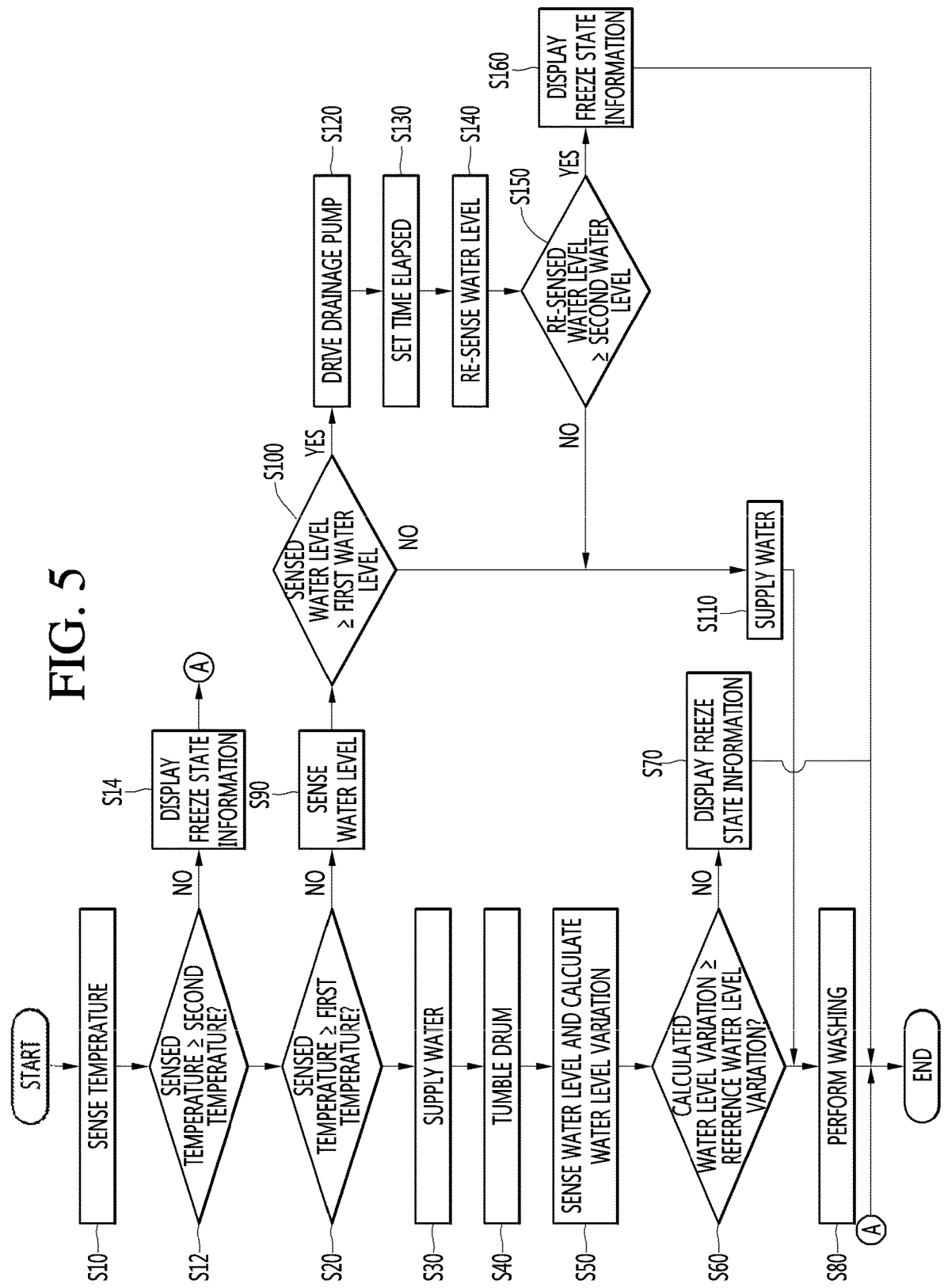
FIG. 5 is a flowchart of a freeze/non-freeze determining method of a washing machine according to a third embodiment.

FIG. 5 is a flowchart of a freeze/non-freeze determining method of a washing machine according to a third embodiment.

Referring to FIG. 5, the control unit 100 according to the present embodiment determines whether the temperature sensed in operation S10 is equal to or greater than a second temperature (S12).

When it is determined in operation S12 that the internal temperature of the tub 20 is equal to or greater than the second temperature, the freeze or non-freeze may be determined by using the same freeze/non-freeze determining method as in the second embodiment.

On the other hand, when it is determined in operation S12 that the internal temperature of the tub 20 is less than the second temperature, the control unit 100 controls the display unit 16B to display freeze state information (S14).

For example, the second temperature may be lower than the first temperature described in the third embodiment. In the present embodiment, the internal temperature of the tub 20 is divided into three different ranges and the freeze or non-freeze is determined by different methods.

For example, the first temperature may be three degrees above zero, and the second temperature may be ten degrees below zero.

When the sensed temperature is less than the second temperature, the freeze state information is immediately displayed on the display unit 16B, regardless of the water level. On the other hand, when the sensed temperature is equal to or greater than the second temperature and less than the first temperature, it is determined as freeze through the sensing of the water level if the water level does not change for a predetermined time. When the sensed temperature is equal to or greater than the first temperature, the freeze or non-freeze is determined by measuring the water level variation through the tumbling of the drum.

As described above, if different freeze/non-freeze determining methods are used according to the temperature, the freeze or non-freeze may be more accurately determined, as compared with the case where the freeze or non-freeze is determined by using the temperature alone.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a washing machine, the method comprising:
    supplying water to a tub;
    driving a driving unit to perform tumbling that includes rotating a drum disposed in the tub;
    calculating a water level variation in the tub based on driving the driving unit;
    comparing the calculated water level variation to a reference water level variation;
    based on the comparison, determining whether the calculated water level variation is less than the reference water level variation; and
    displaying, on a display unit of the washing machine, freeze state information indicating a frozen state of water based on a determination that the calculated water level variation is less than the reference water level variation.

2. The method of claim 1, wherein tumbling comprises:
    rotating the drum in a first direction; and
    rotating the drum in a second direction opposite the first direction.

3. The method of claim 2, wherein tumbling further comprises:
    stopping rotating the drum in the first direction; and
    based on rotation of the drum being stopped, rotating the drum in the second direction.

4. The method of claim 1, wherein the tumbling comprises:
    rotating the drum in a first direction;
    stopping rotating the drum in the first direction for a predetermined time; and
    based on rotation of the drum being stopped for the predetermined time, rotating the drum in the first direction.

5. The method of claim 1, further comprising measuring a frequency output from a water level sensor of the washing machine,
    wherein calculating includes calculating the water level variation based on a variation of the measured frequency output from the water level sensor.

6. A method for controlling a washing machine, the method comprising:
    sensing an internal temperature of a tub;
    comparing the sensed internal temperature of the tub to a first reference temperature;
    based on the comparison, determining whether the sensed internal temperature of the tub is greater than or equal to the first reference temperature;
    supplying water to the tub based on the sensed internal temperature of the tub being greater than or equal to the first reference temperature;
    driving a driving unit to perform tumbling that includes rotating a drum disposed in the tub;
    calculating a water level variation in the tub based on driving the driving unit;
    comparing the calculated water level variation to a reference water level variation; and
    based on the comparison, determining a frozen state of water in the tub.

7. The method of claim 6, further comprising displaying, on a display unit of the washing machine, freeze state information indicating the frozen state of water based on a determination that the calculated water level variation is less than the reference water level variation.

8. The method of claim 6, further comprising:
    sensing a first water level in the tub based on the sensed internal temperature of the tub being less than the first reference temperature.

9. The method of claim 8, further comprising:
    operating a drainage pump for a predetermined time based on a determination that the first water level in the tub is greater than or equal to a first reference water level; and
    sensing a second water level in the tub.

10. The method of claim 9, further comprising displaying, on a display unit of the washing machine, freeze state information indicating the frozen state of water based on a determination that the second water level in the tub is greater than or equal to a second reference water level.

11. The method of claim 6, further comprising:
    comparing the sensed internal temperature of the tub to a second reference temperature lower than the first reference temperature; and based on the comparison, determining whether the sensed internal temperature of the tub is less than the second reference temperature.

12. The method of claim 11, further comprising displaying, on a display unit of the washing machine, freeze state information indicating the frozen state of water based on a determination that the sensed internal temperature of the tub is less than the second reference temperature.

13. The method of claim 11, wherein the first reference temperature is a temperature above zero degrees Celsius, and the second reference temperature is a temperature below zero degrees Celsius.

* * * * *